United States Patent [19]
Yocum

[11] 3,961,819
[45] June 8, 1976

[54] RECORD TOOL
[76] Inventor: Richard A. Yocum, 10730 Pendleton Pike, Indianapolis, Ind. 46236
[22] Filed: Oct. 24, 1975
[21] Appl. No.: 625,678

[52] U.S. Cl. .................................. 294/27 R; 294/6
[51] Int. Cl.² ............................................ B65G 7/12
[58] Field of Search ................. 294/6, 16, 27 R, 28, 294/31 R, 33, 99 R; 224/45 K; 274/1 R, 1 J

[56] References Cited
UNITED STATES PATENTS

| | | | |
|---|---|---|---|
| 2,723,877 | 11/1955 | Palmour et al. | 294/28 X |
| 3,044,097 | 7/1962 | Proschold | 294/6 X |
| 3,219,375 | 11/1965 | Van Pelt | 294/16 |
| 3,282,589 | 11/1966 | Morrison | 294/28 X |

*Primary Examiner*—Johnny D. Cherry
*Attorney, Agent, or Firm*—Jenkins, Hanley & Coffey

[57] ABSTRACT

A record tool comprises a generally semicircular arm portion having a handle attached at the mid point of its outer periphery and a semicircular inwardly opening groove along its inner periphery. The arm portion is extended at its opposed ends to form holding members for engaging two opposed side edges of a record cover or jacket. The tool is manipulated to remove a phonograph record from, and reinsert the phonograph record in, a record jacket thus engaged.

6 Claims, 5 Drawing Figures

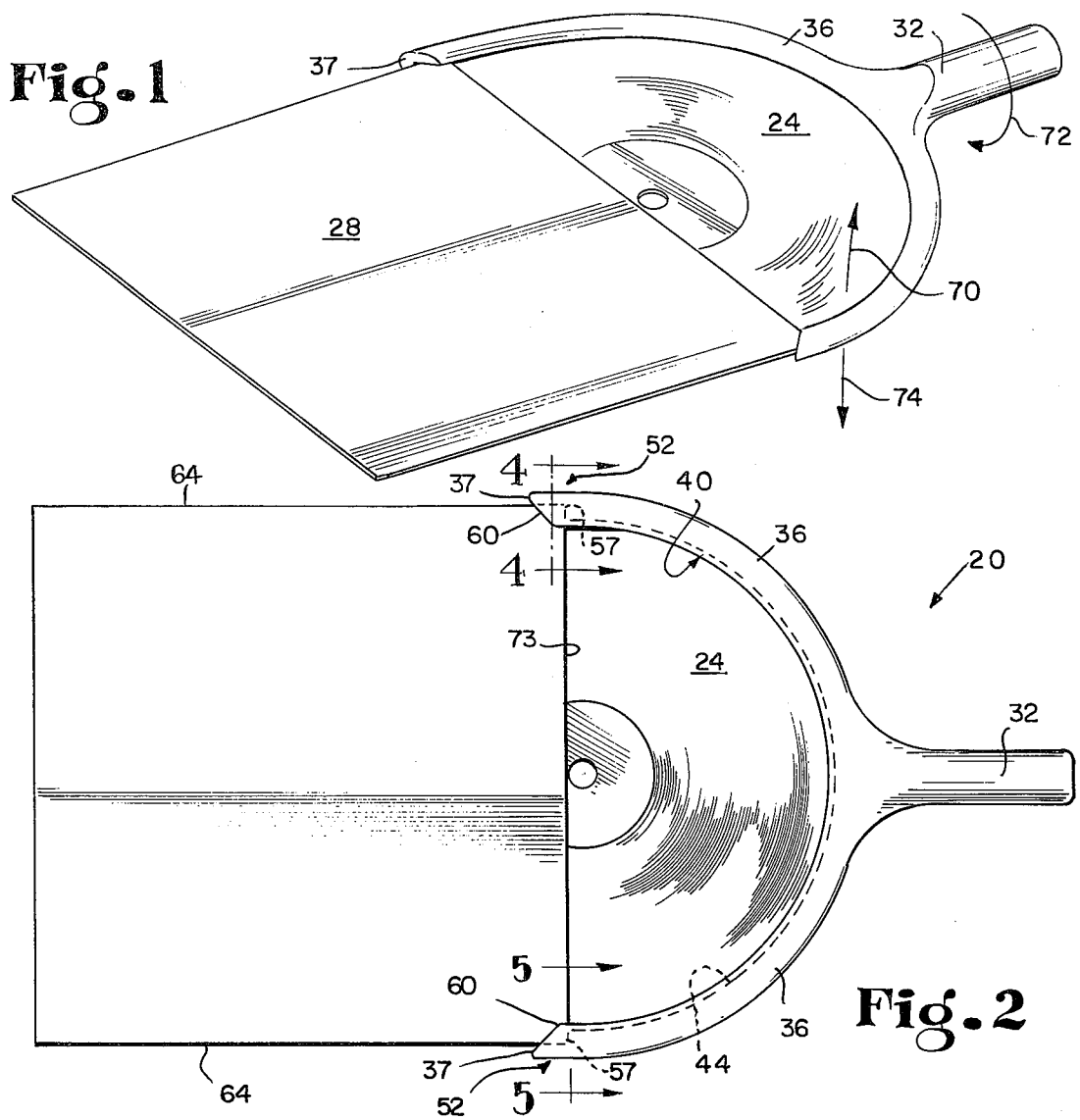
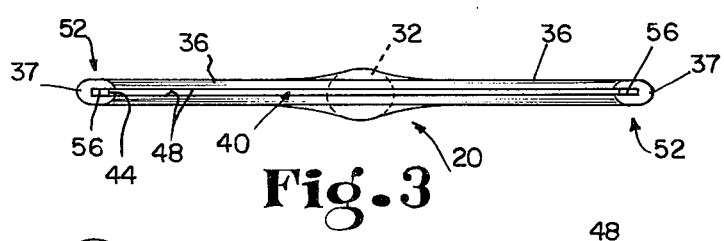
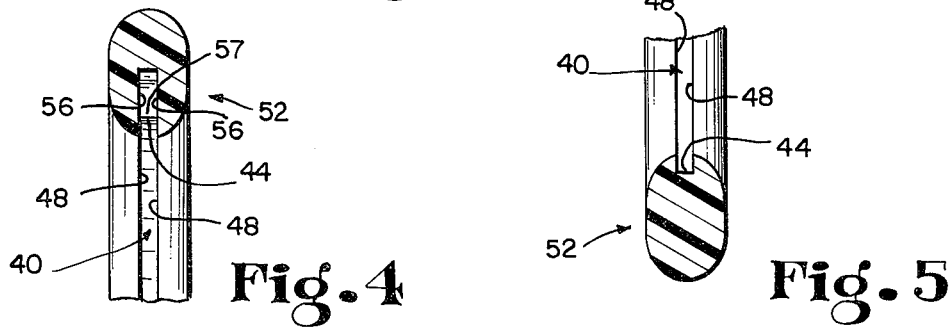

RECORD TOOL

This invention deals with improved apparatus for cleaning and handling phonograph discs, i.e., records, for removing records from, and returning records to, record containers, i.e., jackets.

It is known that the ability to reproduce program material from a phonograph record is seriously impaired by the presence of greases, oils, dirt, dust and particulate matter on the record surface. It is also known that one of the major sources of these contaminants is handling of records by people as the records are removed from their containers, placed on phonographs, removed from phonographs and returned to their containers. Thus, a good deal of contamination of records can be avoided by providing means for handling the records without their coming in contact with the people's hands.

Various types of devices are known for handling records, which devices permit the user to avoid contact between the records and the user's hands. One device of this type is a device for cleaning and packaging records disclosed in U.S. Pat. No. 3,044,097 issued July 17, 1962 to Proschold and entitled "Means for Cleaning and Packaging Phonograph Disc Records". Devices of this type consist of several interlocking parts and may be rather expensive to manufacture. Moreover, devices of the type disclosed by the aforementioned patent cannot be readily manipulated by a user to place a record on a phonograph, but rather, are designed for placement on a flat surface, e.g. a table top, in order to be used.

Another known type of record handling device is that disclosed by U.S. Pat. No. 3,219,375 issued Nov. 23, 1965 to Van Pelt and entitled "Record Handling Device ". There may be difficulties attendant with the manufacture of devices similar to this one also. For example, such a device contemplates the forming of a resiliently deformable wire frame and a pair of record gripping jaws and the attachment of the record gripping jaws to the frame. The record is gripped and held between the jaws by deforming the wire handle of the device but the record has a tendency to pivot about the axes about which the grippers are attached to the wire frame. To combat this tendency, a pair of stops must be formed in the wire frame or attached to the frame to counteract the tendency of the record to rotate. Of course, the stops must contact the record surface at some point and, as a result, may mar the record surface. Further, to remove a record from a record jacket using the device of the aforementioned patent, the record must either first be partially removed from the jacket by hand or the grippers must be inserted into the jacket, which is frequently little more than a snugly fitting envelope for the record. Since there is little room in the jacket for such devices, there is a risk that the record surface may be marred by the grippers during withdrawal of the record from the jacket or reinsertion of the record into the jacket.

It is an object of this invention to provide a hand-held tool for removing a phonograph record from, and reinserting the phonograph record in, a record jacket without the record coming into contact with the user's hands and without the user having to insert any part of the tool into the jacket while the record is in the jacket. It is additionally an object of the present invention to provide such a tool including a handle, an arm member attached to the handle and having a semicircular inwardly opening continuous groove for receiving a portion of the non-playing periphery of a phonograph record disk therein, and means for holding the record jacket in proper orientation with respect to the groove for removing the record from, and reinserting the record into, the jacket.

Other and further objects of this invention will become obvious to those skilled in the art by reference to the following description and accompanying drawings of which:

FIG. 1 is a perspective view of the record tool in use position with a record and a record jacket;

FIG. 2 is a top view of the record tool in use position with a record and a record jacket;

FIG. 3 is a front view of the record tool;

FIG. 4 is a partial sectional view of the record tool taken along section lines 4—4 of FIG. 2 without the record and record jacket; and FIG. 5 is a partial sectional view of the record tool taken along section lines 5—5 of FIG. 2, but without the record and record jacket.

In accordance with the invention of FIGS. 1–5, a hand-held tool 20 for removing a phonograph record 24 from a record jacket 28, and for reinserting record 24 into record jacket 28 includes a handle 32 and a record holding portion or arm 36.

In a preferred embodiment of the invention, record holding arm 36 is generally semicircular in shape and handle 32 is disposed equidistantly between the ends 37 thereof. Disposed around the interior periphery of arm 36 and opening inwardly thereof, is a continuous semicircular groove or channel 40 having a flat bottom 44 and two parallel flat sides 48.

Each of ends 37 is formed to provide holding means 52 for record jacket 28. Each of holding means 52 includes an extension of record holding portion or arm 36 in which the sides 48 of groove 40 are deepened to provide a corner 57 in groove 40 near each of the opposite ends 37 of arm 36. As best shown in FIG. 1, it is against these corners 57 that the corners 60 of two opposite side edges 64 of record jacket 28 rest for removal of record 24 from jacket 28 and reinsertion of record 24 into jacket 28. Referring to the direction arrows of FIG. 1, the record 24 may be removed from record jacket 28 by inserting corners 60 of jacket 28 into record holding means 52 at the opposite ends of arm 36 until corners 60 abut against corners 57 formed in groove 40 and then tilting the record tool 20 in the direction indicated by arrow 70. Record jacket 28 may then be removed from record tool 20 and record 24 may be placed on a phonograph directly from tool 20 by the user without the user having to touch record 24 with his hands. Of course, if the user desires to hear the other side of the record 24, he may simply rotate the tool 20 in the direction of arrow 72 by manipulation of the handle 32.

The ends 37 of arm 36 are formed to facilitate removal of a record 24 from the phonograph by slidingly engaging the periphery of record 24 into groove 40 at ends 37 thereof. Once the record 24 is engaged by tool 20, the user may remove the record 24 from the phonograph without touching the surface of record 24 with his hands. Then the user may reinsert record 24 in jacket 28 by holding tool 20 in the orientation illustrated in FIG. 1, inserting record 24 into record jacket 28 through the open end 73 thereof until corners 60 of record jacket 28 rest against corners 57 of the holding means 52 and then tilting record 20 in the direction indicated by direction arrow 74 of FIG. 1, thereby allowing record 24 to slide from engagement in groove 40 completely into record jacket 28. Record jacket 28 may then be removed from the holding means 52.

As is best illustrated by FIG. 2, ends 37 of arm 36 face generally inwardly of tool 20 to aid in properly locating record jacket 28 in groove 40 of holding means 52.

Groove 40 is proportioned and designed to be of sufficient depth that record 24 will be held securely about approximately one-half of its periphery, yet groove 40 may be so designed that its depth will not be greater than the radial extent of the non-playing peripheral edge where material is conventionally not recorded. Of course, groove 40 may have a generally rectangular cross section, as illustrated in FIGS. 4–5 in the preferred embodiment, or it may have any other desired cross section, e.g., a V-shape.

I claim:

1. A hand-held tool for removing a phonograph record from, and reinserting said record in, a record jacket, said tool comprising a handle, an arm member attached to said handle, said arm member having a semicircular inwardly opening continuous groove for receiving a portion of the radially outer peripheral portion of said record therein, and means for holding said record jacket in the proper orientation with respect to said groove for removing said record from, and inserting said record into, said jacket.

2. The improvement of claim 1 wherein said holding means comprises an extension at each of the opposite ends of said arm member; each said extension including an extension of said semicircular groove, said extended portions of said groove being deeper than said record receiving groove portion for receiving said record jacket, said deeper grooves being proportioned and designed for slidably receiving the opposite side edges of the open end of said jacket therewithin and holding said opposite side edges of said jacket between said arm member extensions.

3. The improvement of claim 2 wherein said arm member is a semicircular piece of material and said handle is centrally disposed between said extensions along the outer periphery of said arm member and lies along the plane defined by said grooves.

4. In a hand-held record handling tool comprising in combination a handle and a record holding portion having a semicircular radially inwardly facing channel, the improvement wherein said channel further has, at the opposite ends thereof, means for holding the container for said record, said container being insertable into said holding means, said tool being tilted in a first direction for removal of said record from said container, and in a second direction for reinsertion of said record in said container.

5. A record tool according to claim 4 wherein said handle and said record holding portion are coplanar, said record holding portion is generally semicircular and said handle is centrally disposed along the outer periphery of said record holding portion.

6. A record tool according to claim 4 wherein said channel has a generally rectangular cross section.

* * * * *